US011739783B2

(12) United States Patent
Houck

(10) Patent No.: US 11,739,783 B2
(45) Date of Patent: Aug. 29, 2023

(54) CONCRETE FASTENER

(71) Applicant: Simpson Strong-Tie Company Inc., Pleasanton, CA (US)

(72) Inventor: Joel Houck, Cedar Lake, IN (US)

(73) Assignee: Simpson Strong-Tie Company Inc., Pleasanton, CA (US)

( * ) Notice: Subject to any disclaimer, the term of this patent is extended or adjusted under 35 U.S.C. 154(b) by 196 days.

(21) Appl. No.: 17/246,247

(22) Filed: Apr. 30, 2021

(65) Prior Publication Data
US 2022/0349436 A1     Nov. 3, 2022

(51) Int. Cl.
F16B 25/00     (2006.01)

(52) U.S. Cl.
CPC ...... F16B 25/0052 (2013.01); F16B 25/0026 (2013.01); F16B 25/0047 (2013.01); F16B 25/0068 (2013.01); *F16B 25/00* (2013.01)

(58) Field of Classification Search
CPC .... F16B 5/0275; F16B 25/00; F16B 25/0026; F16B 25/0047; F16B 25/0052; F16B 25/0057; F16B 25/0068
USPC ......................................... 411/411, 412, 416
See application file for complete search history.

(56) References Cited

U.S. PATENT DOCUMENTS

| | | | |
|---|---|---|---|
| 3,142,503 A * | 7/1964 | Stranberg | F16L 33/23 411/433 |
| 3,388,935 A * | 6/1968 | John | B23B 31/005 285/334 |
| 3,426,642 A | 2/1969 | Phipard, Jr. | |
| 3,643,722 A | 2/1972 | Oestereicher | |
| 4,527,932 A | 7/1985 | Onasch et al. | |
| 4,820,098 A | 4/1989 | Taubert et al. | |
| 4,917,555 A | 4/1990 | Taubert | |
| 5,544,993 A | 8/1996 | Harle | |

(Continued)

FOREIGN PATENT DOCUMENTS

| | | |
|---|---|---|
| CN | 101078413 A | 11/2007 |
| CN | 105387047 | 3/2016 |

(Continued)

OTHER PUBLICATIONS

International Search Report and Written Opinion dated Dec. 17, 2019, International Application No. PCT/US2019/051248.

(Continued)

*Primary Examiner* — Roberta S Delisle
(74) *Attorney, Agent, or Firm* — Vierra Magen Marcus LLP

(57) ABSTRACT

A fastener includes a shank having a first end and a second end defining a length. The fastener includes a thread provided on the shank, the thread including a first region adjacent to the first end and a second region between the first region and a head at the second end, the thread includes a leading edge and a trailing edge, each edge forming an angle with a surface of the shank, the leading edge forming a non-normal angle with the surface of the shank and the trailing edge forming an angle about normal to the surface of the shank. The fastener may include an arcuate detent region in the shank between respective turns of the thread, the detent region having a length, the length decreasing from the first end toward the second end between the respective turns. The fastener may include a plurality of flutes positioned along a length of the shank.

11 Claims, 10 Drawing Sheets

(56) References Cited

U.S. PATENT DOCUMENTS

| | | | |
|---|---|---|---|
| 5,674,035 A | 10/1997 | Hettich et al. | |
| 5,704,750 A | 1/1998 | Bartos et al. | |
| 5,759,003 A * | 6/1998 | Greenway | F16B 25/10 411/417 |
| 5,788,441 A * | 8/1998 | Karabestos | B21H 3/06 470/10 |
| 5,827,030 A | 10/1998 | Dicke | |
| 5,897,280 A | 4/1999 | Dicke | |
| 6,056,491 A | 5/2000 | Hsu | |
| 6,332,741 B1 | 12/2001 | Janusz | |
| 6,419,435 B1 | 7/2002 | Gaudron | |
| 6,789,991 B2 | 9/2004 | Hsu | |
| 7,156,600 B2 | 1/2007 | Panasik et al. | |
| 7,195,437 B2 * | 3/2007 | Sakamoto | F16B 33/06 411/428 |
| 7,798,756 B2 | 9/2010 | Chang | |
| 8,348,571 B2 | 1/2013 | Shih | |
| 8,753,056 B2 | 6/2014 | Gstach et al. | |
| D875,514 S | 2/2020 | Zhang | |
| 11,156,248 B2 | 10/2021 | Vogel et al. | |
| 2003/0031528 A1 | 2/2003 | Kram et al. | |
| 2004/0156696 A1 * | 8/2004 | Grosch | B29C 66/721 411/378 |
| 2005/0186047 A1 | 8/2005 | Sakamoto | |
| 2007/0269287 A1 | 11/2007 | Runge et al. | |
| 2008/0050198 A1 * | 2/2008 | Ayrle | F16B 13/002 411/386 |
| 2011/0217145 A1 | 9/2011 | Kochheiser et al. | |
| 2012/0155990 A1 | 6/2012 | Chao | |
| 2012/0207564 A1 | 8/2012 | Kochheiser | |
| 2012/0251268 A1 | 10/2012 | Yu | |
| 2013/0302111 A1 | 11/2013 | Shih | |
| 2015/0052735 A1 | 2/2015 | Kochheiser | |
| 2016/0032956 A1 * | 2/2016 | Wu | F16B 25/10 411/387.8 |
| 2017/0254352 A1 | 9/2017 | Chen | |
| 2018/0106287 A1 * | 4/2018 | Eckert | F16B 25/0047 |

FOREIGN PATENT DOCUMENTS

| | | |
|---|---|---|
| EP | 0012441 | 6/1980 |
| EP | 0623759 | 11/1994 |
| GB | 1072609 | 6/1967 |
| GB | 2516628 | 2/2015 |
| JP | 50-154656 A | 12/1975 |
| JP | S61-211510 A | 9/1986 |
| JP | H4-133013 | 12/1992 |
| KR | 10-2014-0013295 | 2/2014 |
| WO | 2011/143733 | 11/2011 |
| WO | 2016048822 | 3/2016 |
| WO | 2020060902 | 3/2020 |

OTHER PUBLICATIONS

International Preliminary Report on Patentability dated Apr. 1, 2021, International Application No. PCT/US2019/051248.
Houck, "Fastener With Continuous Detent Region", U.S. Appl. No. 16/137,502, filed Sep. 20, 2018.
Non-Final Office Action dated Sep. 14, 2020, U.S. Appl. No. 16/137,502.
Response to Non-Final Office Action dated Dec. 14, 2020, U.S. Appl. No. 16/137,502.
Notice of Allowance dated Jan. 7, 2021, U.S. Appl. No. 16/137,502.
Examination Report No. 1 dated Mar. 18, 2022, Australian Patent Application No. 2019344655.
Response to Examination Report No. 1 dated Mar. 16, 2023, Australian Patent Application No. 2019344655.
Office Action dated Aug. 2, 2022, Canadian Patent Application No. 3,113,635.
Office Action dated Aug. 29, 2022, Chinese Patent Application No. 201980067210.3.
Response to Office Action dated Mar. 9, 2023, Chinese Patent Application No. 201980067210.3.
Office Action dated Aug. 2, 2022, Japanese Patent Application No. 2021-516438.
Response to Office Action dated Jan. 26, 2023, Japanese Patent Application No. 2021-516438.
Examination Report dated Oct. 18, 2021, New Zealand Patent Application No. 748254.
Response to Examination Report dated May 18, 2022, New Zealand Patent Application No. 748254.
Examination Report dated Jun. 10, 2022, New Zealand Patent Application No. 748254.
Notice of Acceptance dated Jun. 16, 2022, New Zealand Patent Application No. 748254.
Reply to Written Opinion dated Feb. 10, 2022, European Patent Application No. 19778775.7.
International Search Report and Written Opinion dated Jul. 14, 2022, International Application No. PCT/US2022/025603.
Examination Report dated Aug. 26, 2022, New Zealand Patent Application No. 774188.
Response to Examination Report dated Mar. 23, 2023, New Zealand Patent Application No. 774188.
Notice of Acceptance dated Apr. 4, 2023, Australian Patent Application No. 2019344655.
Office Action dated Apr. 14, 2023, Chinese Patent Application No. 201980067210.3.
Notice of Reasons for Rejection dated Apr. 18, 2023, Japanese Patent Application No. 2021-516438.
Examination Report dated Apr. 6, 2023, New Zealand Patent Application No. 774188.
Response to Examination Report dated May 10, 2023, New Zealand Patent Application No. 774188.
Communication pursuant to Article 94(3) EPC dated May 31, 2023, European Patent Application No. 19778775.7.
Response to Office Action dated Jun. 20, 2023, Chinese Patent Application No. 201980067210.3.

* cited by examiner

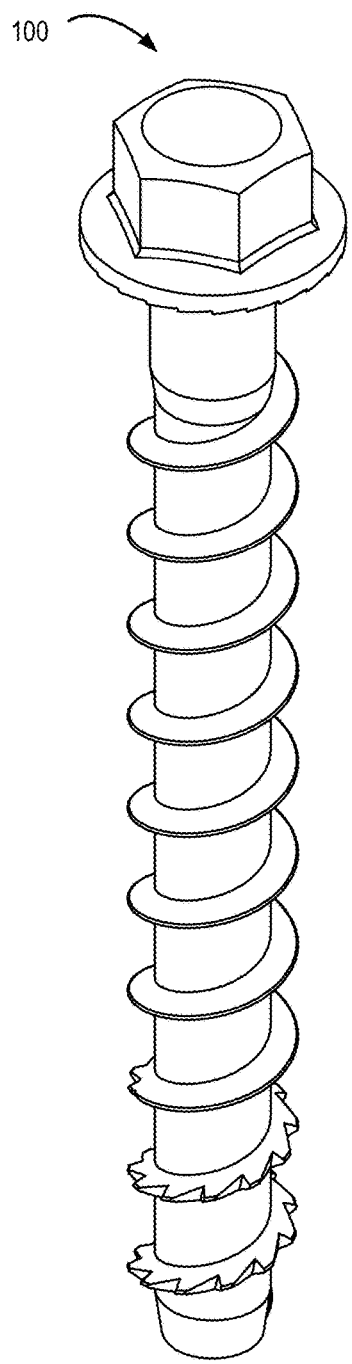
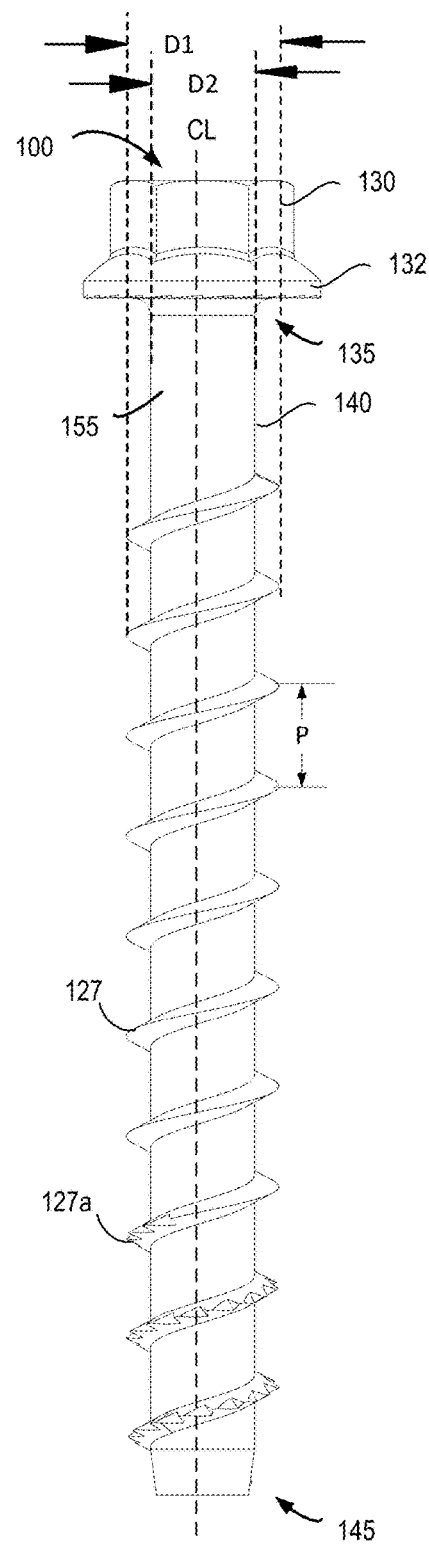
FIG. 1
(Prior Art)
FIG. 2
(Prior Art)

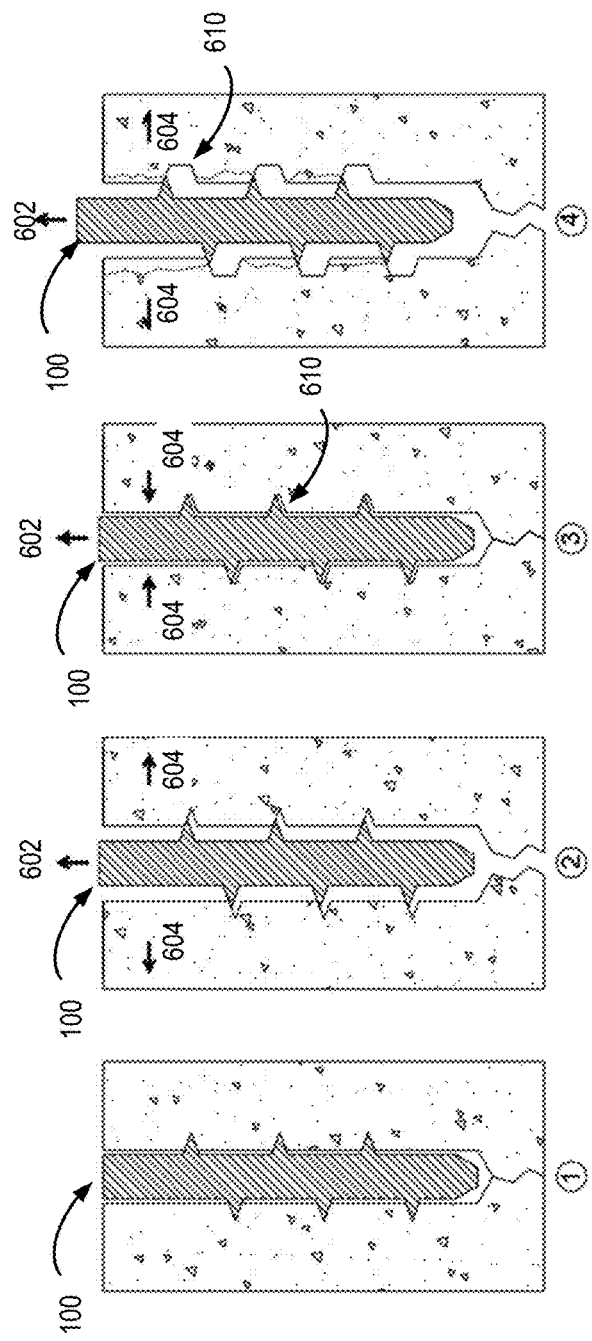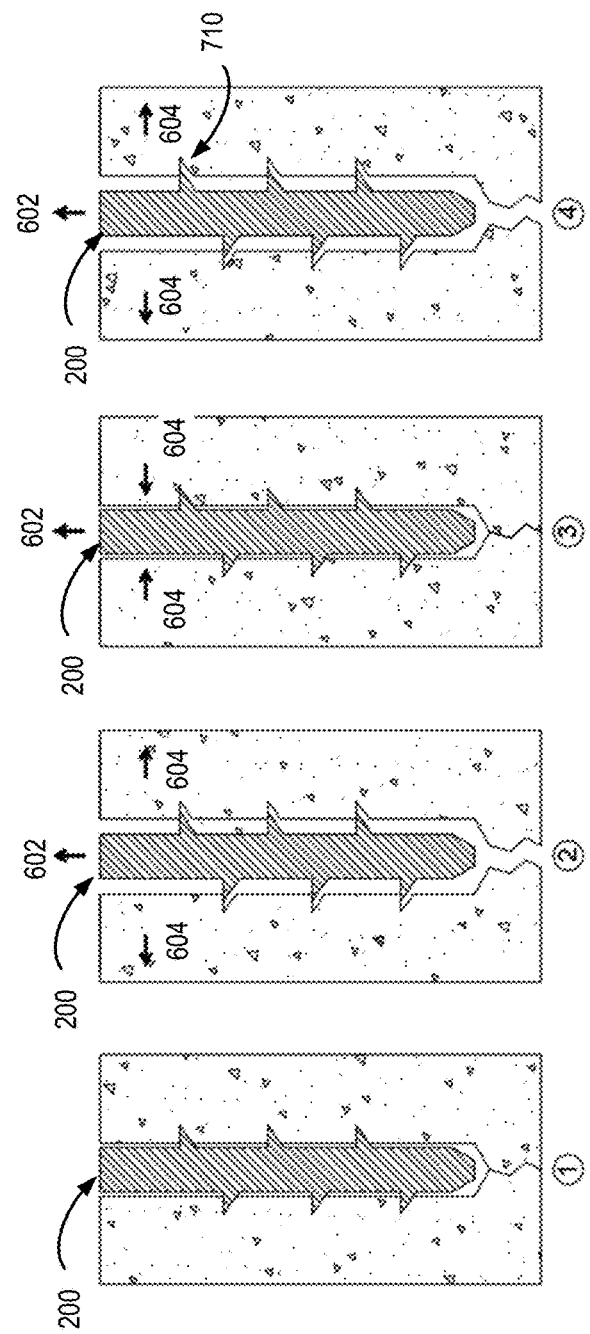

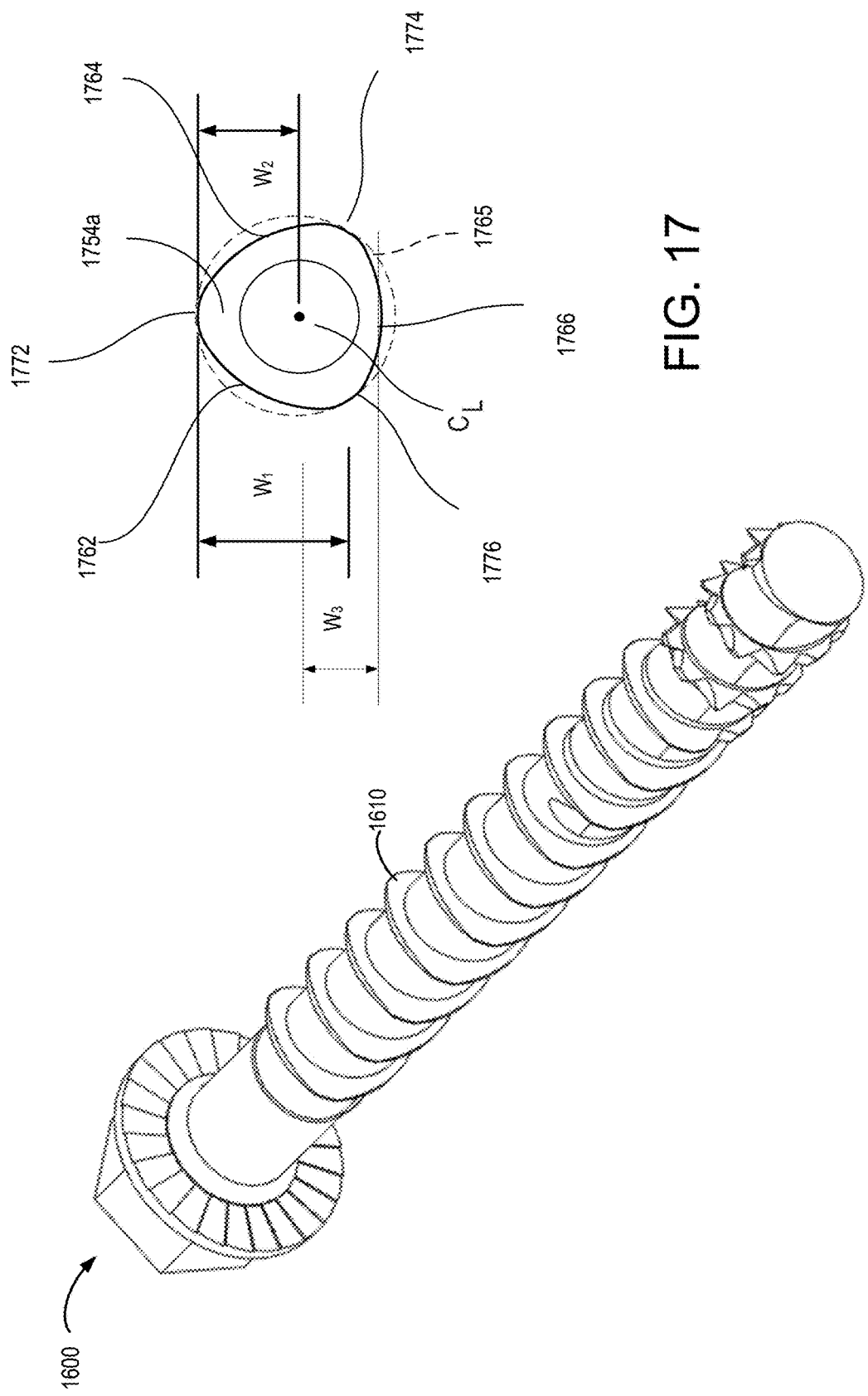

CONCRETE FASTENER

TECHNICAL FIELD

The present technology relates to a thread-tapping fastener, and in particular a concrete fastener, and improvements thereto.

BACKGROUND

Thread-tapping concrete screws are screwed into holes drilled into a construction material, especially concrete, without the use of a plug. Here, the diameter of the drilled hole is greater than the core diameter of the screw and smaller than the outer diameter of the screw with the thread. Consequently, as the screw is being screwed in, especially by means of an impact driver, the screw works its way into the construction material in such a way that the thread taps or cuts a mating thread into the construction material. Therefore, the screw itself cuts the thread or mating thread needed for the required positive fit between the thread and the construction material.

When the thread-tapping screw is being screwed into a drilled hole, stone powder from the construction material is formed in the area of the end of the screw. The stone powder can result from not being completely removed from the drilled hole after the hole was made and/or the stone powder is formed when the thread-tapping screw is being screwed into the drilled hole in the area of the end of the screw.

SUMMARY

Described herein is a fastener. The fastener includes a shank having a first end and a second end defining a length. The fastener includes a thread provided on the shank, the thread including a first region adjacent to the first end and a second region between the first region and a head at the second end, the thread includes a leading edge and a trailing edge, each edge forming an angle with a surface of the shank, the leading edge forming a non-normal angle with the surface of the shank and the trailing edge forming an angle within five degrees of normal to the surface of the shank.

Implementations may include a fastener in accordance with any of the foregoing features further including an arcuate detent region in the shank between respective turns of the thread, the detent region having a length, the length decreasing from the first end toward the second end between the respective turns. Implementations may include a fastener in accordance with any of the foregoing features wherein the detent is separated from the respective turns by the circular cross-section on a first side of the detent and a second side of the detent by flat separation. Implementations may include a fastener in accordance with any of the foregoing features wherein the thread extends from the first end adjacent to a tip of the shank, and a plurality of flutes are positioned along a length of the shank. Implementations may include a fastener in accordance with any of the foregoing features wherein the detent region has a depth, and the depth of the detent region decreases between the tip and the head. Implementations may include a fastener in accordance with any of the foregoing features wherein the thread has a triobular cross-section. Implementations may include a fastener in accordance with any of the foregoing features wherein a portion of the thread includes a sawtooth structure may include a plurality of shell-shaped teeth. Implementations may include a fastener in accordance with any of the foregoing features wherein the thread may include a first thread and further includes a second lead thread interposed between turns of the first thread.

Another general aspect includes a fastener having a shank having a first end and a second end defining a length. The fastener includes a thread provided on the shank, the thread including a first region adjacent to the first end and a second region between the first region and a head at the second end, the thread includes a leading edge and a trailing edge in a first portion of the thread and a second portion of the thread, the first portion of the thread adjacent to the first end and having a first thread angle, the second portion of the thread between the first end and the second portion having a second, smaller angle.

Implementations may include a fastener in accordance with any of the foregoing features wherein the fastener further includes an arcuate detent region in the shank between respective turns of the thread, the detent region having a length, the length decreasing from the first end toward the second end between the respective turns. Implementations may include a fastener in accordance with any of the foregoing features wherein the detent is separated from the respective turns by the circular cross-section on a first side of the detent and a second side of the detent by flat separation. Implementations may include a fastener in accordance with any of the foregoing features wherein the fastener has a thread which extends from the first end adjacent to a tip of the shank, and a plurality of flutes are positioned along a length of the shank. Implementations may include a fastener in accordance with any of the foregoing features wherein the detent region has a depth, and the depth of the detent region decreases between the tip and the head. Implementations may include a fastener in accordance with any of the foregoing features wherein a portion of the thread includes a sawtooth structure may include a plurality of shell-shaped teeth.

A further aspect includes a fastener having a first end and a second end defining a length. The fastener includes a thread provided on the shank, the thread including a first region adjacent to the first end and a second region between the first region and a head at the second end, the thread includes a leading edge and a trailing edge, each edge forming an angle with a surface of the shank, the leading edge forming a non-normal angle with the surface of the shank and the trailing edge forming an angle about normal to the surface of the shank. The fastener includes an arcuate detent region in the shank between respective turns of the thread, the detent region having a length, the length decreasing from the first end toward the second end between the respective turns.

Implementations may include a fastener in accordance with any of the foregoing features wherein the fastener where the detent is separated from the respective turns by the circular cross-section on a first side of the detent and a second side of the detent by flat separation regions. Implementations may include a fastener in accordance with any of the foregoing features wherein the thread includes a leading edge and a trailing edge, each edge forming an angle with a surface of the shank, the leading edge forming a non-normal angle and the trailing edge forming an angle normal to the surface. Implementations may include a fastener in accordance with any of the foregoing features wherein the thread includes a leading edge and a trailing edge in a first portion of the thread and a second portion of the thread, the first portion of the thread adjacent to the first end and having a first thread angle, the second portion of the thread between the first end and the second portion having a second, smaller angle. Implementations may include a fastener in accordance with any of the foregoing features wherein the thread extends from the first end adjacent to a tip of the shank, and a plurality of flutes are positioned along a length of the shank. The detent region has a depth, and the depth of the detent region decreases between the tip and the head.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 is a perspective view of a prior art concrete fastener.

FIG. 2 is a plan view of the fastener of FIG. 1

FIGS. 6 and 7 are sequences illustrating the effect of pullout forces on the embodiments of fasteners disclosed in FIGS. 1-2 and FIGS. 3-5 over time.

FIG. 16 is a partial perspective view of a fastener showing another feature for use alone or in combination with any one or more of the features for a concrete fastener described herein, the feature comprising a triobulor thread.

FIG. 17 is an end view of the fastener FIG. 16.

DETAILED DESCRIPTION

Figure 5:
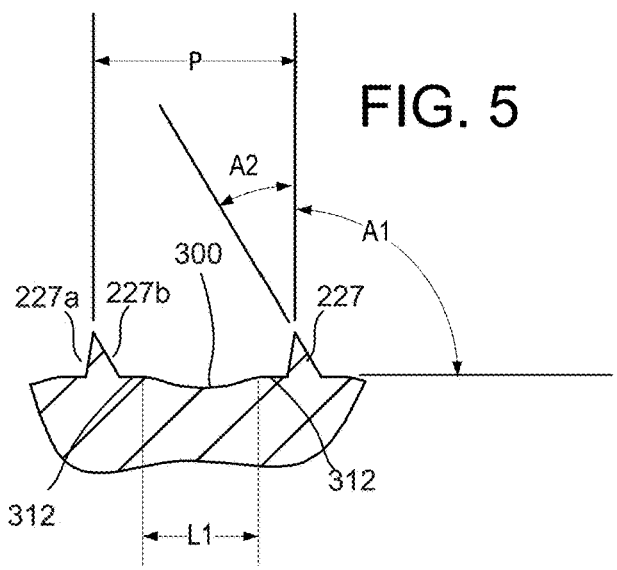
FIG. 5 is an enlarged view of a portion of FIG. 4.

Improvements in a concrete fastener are described herein. Various features described may be used alone or in one or more combinations to provide a unique fastener with improved strength and installation features as described herein. One general aspect includes a fastener. The fastener includes a shank having a first end having a tip and a second end having a head, the first and second ends defining a length. The fastener includes a thread provided on the shank, and in embodiments may include an arcuate detent region in the shank between respective turns of the thread. The detent region has a length along the shank between the respective turns, the length decreasing from the first end toward the second end between the respective turns. The detent region may decrease in depth between the first end and the second end. The detent region may be separated from the respective turns by the circular cross-section on a first side of the detent and a second side of the detent by flat separation regions. The thread may have a leading edge and a trailing edge, each edge forming an angle with a surface of the shank, the leading edge forming a non-normal angle and the trailing edge forming an angle which is approximately normal to the surface. A first portion of the thread adjacent to the first end may have a first thread angle and a second portion of the thread may have a second, smaller angle. The thread may extend from the first end adjacent to a tip of the shank, with a plurality of flutes are positioned along a length of the shank. The thread may include a triobular cross-section. A portion of the thread may include a sawtooth structure which may include a plurality of shell-shaped teeth. The thread may include a first thread and further includes a second lead thread interposed between turns of the first thread.

FIGS. 1 and 2 illustrate a prior art concrete fastener 100 which may be into a pre-drilled drilled in concrete. FIG. 1 is a perspective view of a prior art concrete fastener. FIG. 2 is a plan view of the fastener of FIG. 1.

The fastener 100 has a fastener head comprising nut 130 and washer 132 at one end of a fastener shank 140. A thread 127 is provided on the fastener shank 140. Shank 140 has a section 155 that is configured without a thread 127. The section 155 transitions to integral washer 132 and nut 130 at 135. The shank 140 has a root diameter D2 of the fastener shank 5 as well as an outer diameter D1 on the thread 127. The thread 127 also has a pitch P, which corresponds to the distance between any two windings of the thread 127 (FIG. 2). The fastener 100 is inserted in a pre-drilled hole having a diameter matching or slightly larger than a shank of the fastener.

A front section 127a of the fastener 100 starts at the fastener end 145 and runs in the direction of a longitudinal axis CL of the fastener 100 towards the fastener head. The front section 127a in this embodiment encompasses approximately two windings of the thread 127.

Figure 4:
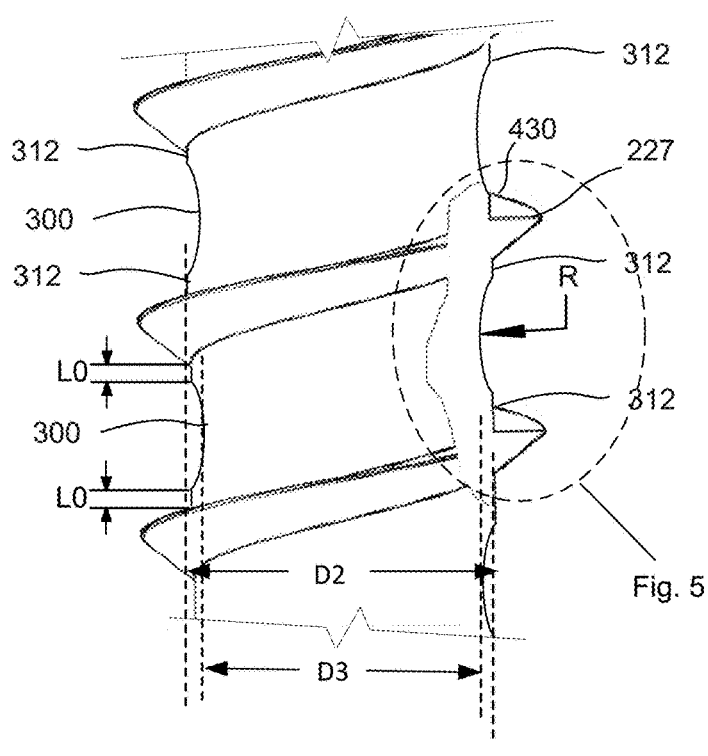
FIG. 4 is a partial, enlarged, cutaway view along line 4-4 in FIG. 3.
Figure 3:
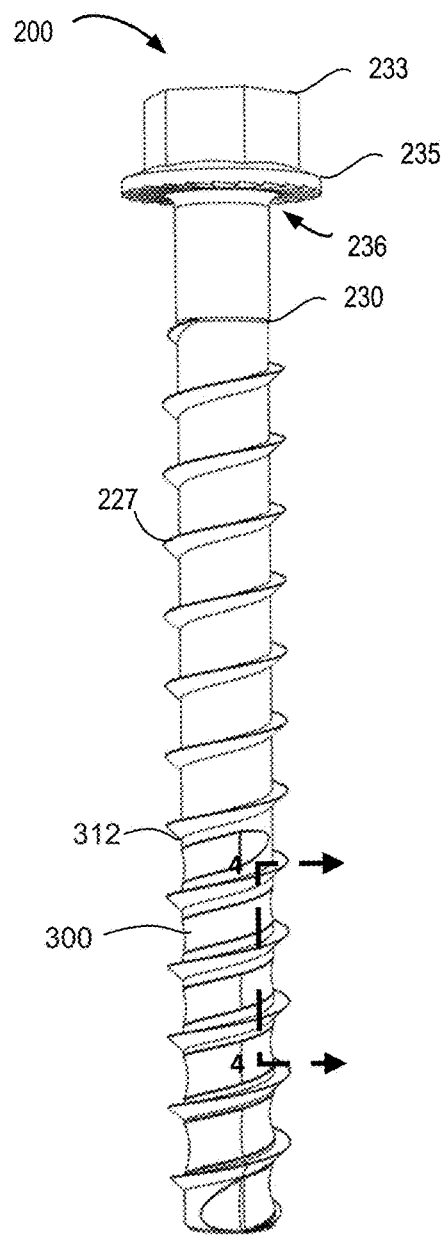
FIG. 3 is a plan view of a fastener showing a first feature for use alone or in combination with any one or more of the fastener features described herein, the feature comprising a flat-topped thread.

FIGS. 3-5 illustrate two unique features of the present technology which, although illustrated together, may be used alone or in combination with each other or with other features described herein. The first feature comprises a flat-topped thread running the length of the shank. The second feature comprises a shank detent region between the threads. FIG. 3 is a plan view of a fastener showing the first and second features for use alone or in combination. FIG. 4 is a partial, enlarged, cutaway view along line 4-4 in FIG. 3. FIG. 5 is an enlarged view of a portion of FIG. 4.

In accordance with the various embodiments described herein, a first improved feature is a flat-topped thread 227. In this context, the "top" 227a of the thread 227 comprises the portion of the thread facing a head 236, also known as a trailing edge of the thread. Head 236 may comprise a nut 233 in integral washer 235. Thread 227 has a leading edge 227b facing a tip of the fastener and trailing edge 227a facing the head 236 of the fastener 200. In this context, the term "flat" (or "flat-topped") refers to trailing edge 227a having a surface which defines an angle (A1) normal or nearly normal to a surface portion (which in FIG. 5 comprises regions 312) of the shank 230. In embodiments, A1 is between 80° and 95°, and may be between 85° and 90° such that the trailing edge 227a surface defines an angle nearly normal to the separation region 312 surface the shank 230. Thread 227 may have any number of turns depending on the length of the shank 230 of fastener 200. In one embodiment, thread 227 has a first section 228 having a serrated edge over two turns of the thread 227.

In a further unique aspect of the technology, the shank includes a dust removal detent 300 formed between turns of the thread 270. The detent 300 is a continuous helical structure formed in the shank and interleaved between and matching the turns of the thread 227. As illustrated in FIG. 3, the detent 300 is positioned along a portion of the length or along the entire length of the shank in a section of shank 230 which includes thread 227, between turns of the thread. The detent is formed to have a concave and arcuate shape relative to the shank, with the arcuate shape defined by a radius R (FIG. 4). It should be understood that the radius R may vary relative to the size of the screw such that larger fasteners have larger radii. In one embodiment of a fastener having a four-inch length between a tip of the fastener and the bottom of washer 235, the radius may be 0.23 inch. The detent has a depth of one half of the difference in the diameters D2 and D3 ((D2 minus D3)/2) which ranges from 0.025" to 0.010" for a fastener with the aforementioned radius and length, from the leading end of the fastener to the head end of the fastener. The detent 300 as viewed in cross section in FIGS. 3 and 4 has a length L1 and is separated from turns of the thread 130 by separation regions 312 having a length L0 of the surface of the shank. In one embodiment, the length of the separation regions 312 is constant over the length of the portion of the shank having thread 227. (In alternative embodiments, discussed below, the length of the separation regions may vary between the tip and the head.) The separation regions 312, 314 are positioned so that the arcuate cross-section begins at the separation regions 312 at the minor diameter D2 and comprise flat (as viewed in FIGS. 4 and 5) portions of the surface of the shank between the thread turns. The arcuate cross-section of the detent extends to a depth which at the center of the detent region has a diameter D3, smaller than D2.

In one embodiment, the detent depth varies along the length of the fastener between the detent near the tip (having the greatest depth) and gets shallower as the detent moves away from the tip. As noted above, the depth and radius change with the size of the screw. A ratio between D2:D3 may define a characteristic of the fastener. On a smaller fastener, a first revolution of the recess is defined by a D2:D3 ratio of about 1.16. For the same fastener, at the midpoint of the recess the ratio is about 1.10. This will change with other sizes (diameters) of the fastener. The ratio will get smaller as the fasteners become larger due to the increased diameter of the fastener will be increasing at a larger amount than the depth of the recess. Additional details of the depth of the detent regions are described below.

In one embodiment, L1 is approximately two times greater than L0. The separation regions 312 make a smooth transition 310 between such regions and the detent 300 (such as by means of a rounded edge).

The detent 300 holds debris created when drilling a hole in concrete or masonry in addition to debris that is created while installing the fastener. The smooth, arcuate shape of the detent regions significantly improves particulate holding when inserting the fastener into materials such as concrete and masonry. The arcuate nature of the detent allows particulate a position within which to rest while the fastener is inserted into the material to be fastened, thereby not impeding progress of the fastener. In one embodiment, the dust channel provides about a 15% reduction in installation effort over a similar fastener created without the dust channel.

It should be recognized that in various embodiments of the present technology, no detent 300 need be used. The flat tipped thread structure illustrated in FIGS. 3-5 provides a reduction in installation energy and improved performance in wide crack seismic testing. The flat top allows the concrete to slide back and forth over the thread without crushing or damaging the concrete during the test, and it reduces the amount of fastener displacement during the test.

As illustrated in FIGS. 4 and 5, a top portion of thread 227 is oriented at an angle A1 which is near or about normal to the surface (here 312) of the shank and is in a range of 80–95°, and in one embodiment is approximately 87° relative to a surface of the 312. Angle A1 may be in a range of approximately 80-95°, and in embodiments is between 85° and 90°, and in other embodiments is between 87° and 90°. In other embodiments, the top portion of the thread 227 forms angle A1 with a surface of the shank at the minor diameter D2 without the detent regions (as in FIG. 7). A leading portion of the thread forms an angle A2 with the top portion of the thread. In embodiments, A2 is 37 to 40° but may vary between 30 and 40 degrees.

FIGS. 6 and 7 are cross-sectional views of fastener 100 and fastener 200, respectively, representing the pull-out effect on a concrete substrate when the fastener has a flat (A1=85-90°) top surface (FIG. 7) and an angled top surface (FIG. 6) when at four stages (labeled 1 through 4 in each FIG.). FIGS. 6 and 7 are sequences illustrating the effect of pullout forces on the embodiments of fasteners disclosed in FIGS. 1-2 and FIGS. 3-5 over time.

At stage 1 of FIGS. 6 and 7, the respective fastener 100, 200 is at rest in a concrete slab, having been installed in a pre-drilled hole. A crack has formed in the concrete due to external forces acting on the concrete, and the crack has intersected the fastener location. As a pull-out force 602 is exerted on the fasteners at stage 2 in FIGS. 6 and 7, lateral forces 604 are exerted by external forces acting on the concrete, causing some separation in the concrete slab away from the fastener. At this stage the angle on the top of the thread along with the pullout force on the fastener causes the fastener to slip upwards in the hole. As illustrated at stage 3, the removal of the external load along with the elasticity of reinforcing bars embedded in the concrete will cause the concrete to move back toward the fastener as the pull out force 602 remains constant. Because the fastener has already slipped up in the hole, the concrete is crushed slightly at the top of the thread as the concrete returns to its original position. Note that at stage 3 of FIG. 6, some separation 610 begins to occur between the thread groove in the concrete slab and the thread of the fastener, loosening the strength of the fastener in the slab. Over time, this results in an enlarged groove 610 as shown at stage 4 of FIG. 6. In contrast, as illustrated at 710 in FIG. 7, the flat-topped fastener exhibits much less concrete groove degradation, resulting in improved pull-out resistance of the fastener 200.

In testing over 59 cycles comparing the fastener of FIG. 6 vs. that of FIG. 7, a fastener loaded with tension and cycled closed configured in the manner of the fastener of FIG. 6 failed while that configured in the manner of FIG. 7 (and FIGS. 3-5) did not fail. Moreover, the flat-topped thread fastener of FIGS. 3-5, and 7 provided a 21% reduction in installation energy.

As noted above, the thread structure of FIGS. 3-5 may be used alone in a fastener or in combination with any one or more of the features described herein.

Figure 8:
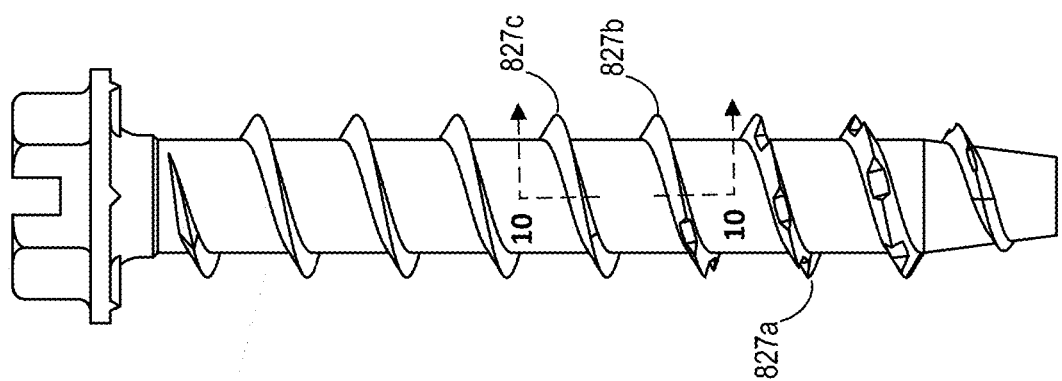
FIG. 8 is a plan view of a fastener showing another feature for use alone or in combination with any one or more of the features described for a concrete fastener described herein, the feature comprising a dual angle thread.
Figure 9:
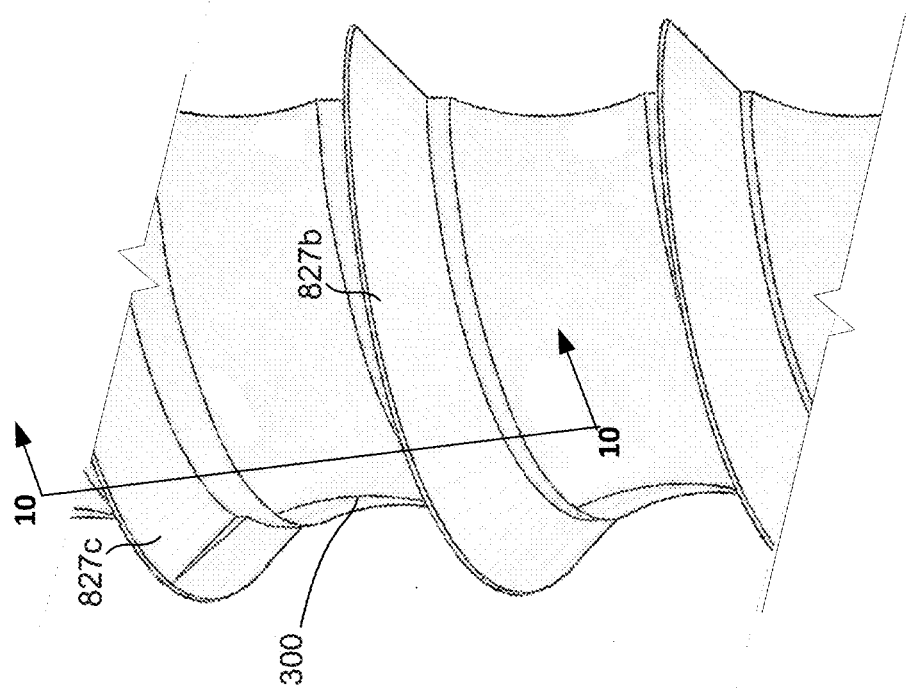
FIG. 9 is a partial perspective view of the fastener of FIG. 8.
Figure 10:
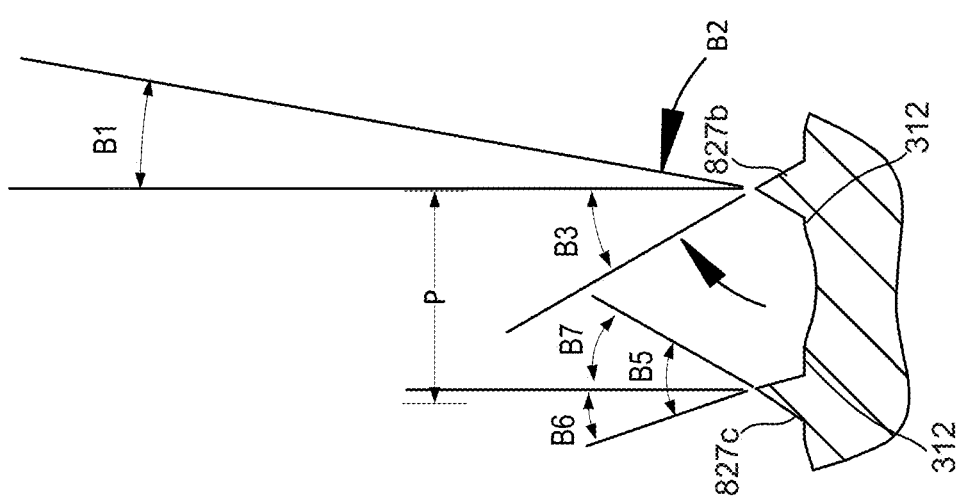
FIG. 10 is a cross-sectional view along the lines 10-10 in FIGS. 8 and 9.

FIGS. 8-10 illustrate another feature which may be incorporated into embodiments of a concrete fastener as described herein. FIG. 8 is a plan view of a fastener showing another feature for use alone or in combination with any one or more of the features described for a concrete fastener. FIG. 9 is a partial perspective view of the fastener of FIG. 8. FIG. 10 is a cross-sectional view along line 10-10 in FIGS. 8 and 9. As illustrated in FIGS. 9 and 10, thread 827 has a first portion 827a which may include a serrated edge, and has a first thread angle (B2) which extends to a non-threaded portion 827b of thread 827. A second portion 827c of thread 827 has a different, smaller, asymmetric thread angle B5. As illustrated in FIG. 8, fastener 800 may have a cylindrical shaft without a dust channel or may include a dust channel 300.

In one embodiment, portion 827b has a thread angle B2 which is symmetrical (with B2 being on the order of 50° and angles B1 and B3 being equal). In other embodiments, B1 does not equal B3 and thread angle B2 is asymmetrical. Thread portion 827c has a smaller thread angle B5 which may be asymmetrical and on the order of 40°. In one embodiment, the leading edge threads of thread region 827c have an extra 5 or 10° on the bottom (leading) side of the thread to cut a slightly larger path in the concrete so the following threads have less friction against the concrete. This provides the advantage of reducing the installation energy for the fastener. The thread of region 827c may have a leading-edge angle B6 of 15° and a trailing angle B7 of 25°. It will be recognized that other leading edge and trailing edge angles may be utilized within the scope of the technology.

As noted above, the thread structure of FIGS. 8-10 may be used alone in a fastener or in combination with any one or more of the features described herein.

Figure 11:
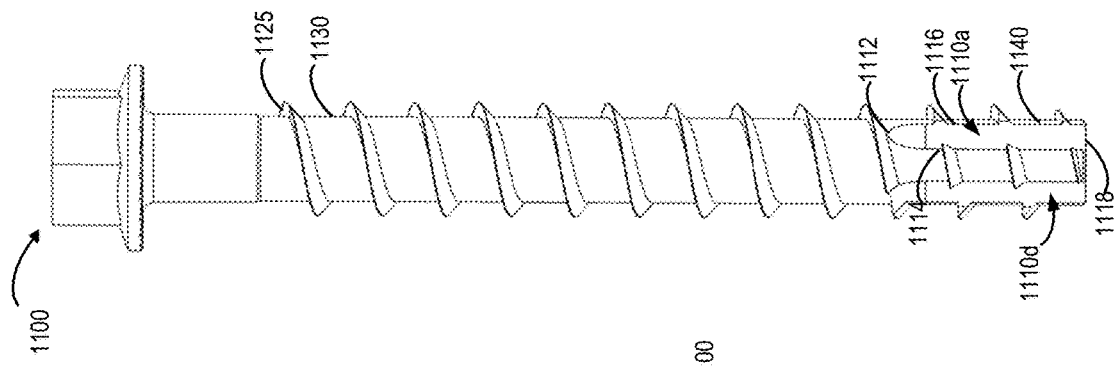
FIG. 11 is a perspective plan view of a fastener showing another feature for use alone or in combination with any one or more of the features described for a concrete fastener described herein, the feature comprising a fluted tip.
Figure 13:
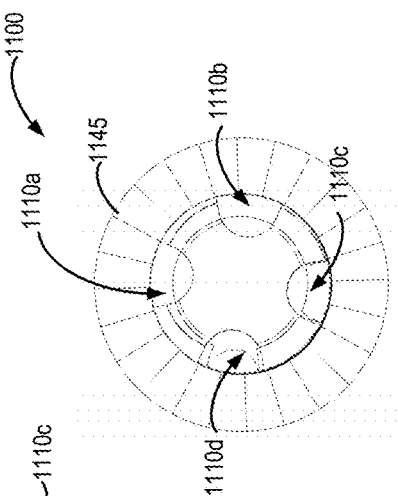
FIG. 13 is an end view of the fastener of FIG. 11.
Figure 12:
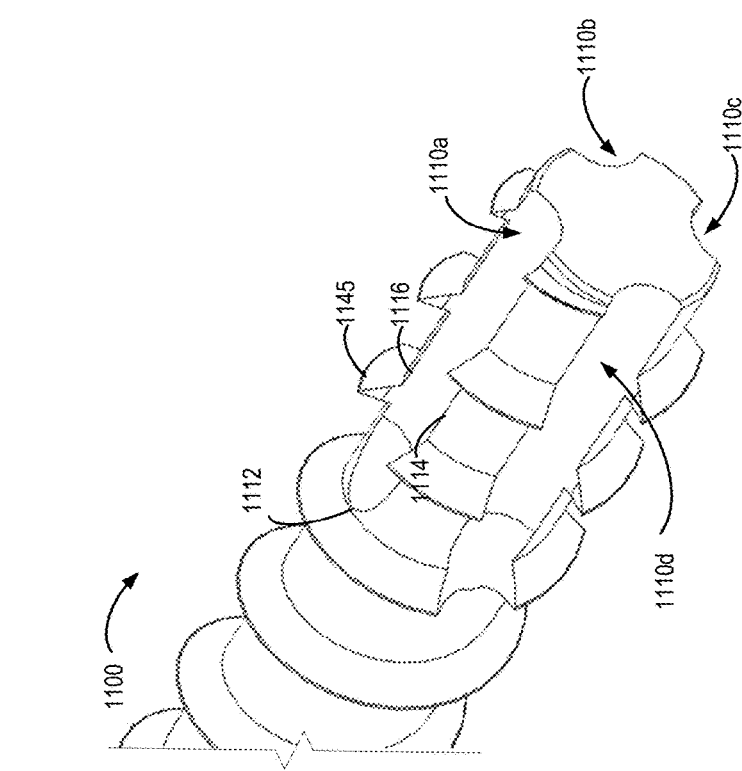
FIG. 12 is a partial perspective view of the fastener FIG. 11.

FIGS. 11-13 show another feature which may be incorporated into any of the embodiments of the fastener described herein. FIG. 11 is a perspective plan view of a fastener comprising a fluted tip. FIG. 12 is a partial perspective view of the fastener FIG. 11. FIG. 13 is an end view of the fastener of FIG. 11.

In the embodiment of FIGS. 11-13 fastener 1100 shows four flutes 1110a-1110d which form a cutting structure in the tip of the fastener 1100. One to six flutes may be utilized. In one embodiment, two flutes are advantageous from a manufacturing and performance perspective. Each flute is bordered by two sides, such as sides 1114 and 1116, and an end 1112. In the embodiment of FIGS. 11-13, each flute 1110a-1110d intersects three turns of thread 1145. When the fastener 1100 is being fastened into a drilled hole (not shown here) in a construction material, the stone powder created in this process can thus be more easily conveyed in the flutes 1110a from a leading end section of the flute at the fastener leading end and backwards towards the fastener head, as a result of which less stone powder or no stone powder is present between the fastener shank and the wall of the drilled hole. In addition, the fluted cutting structure breaks up the continuous thread to give many new sharp edges for cutting the concrete, especially with an impact wrench with a hammering action (yielding a lower installation energy, and better installation in harder concrete). The flutes provide path for the dust generated during drilling and installation to fall to the bottom of the hole instead of binding up in the threads, resulting in less friction and consequently a lower installation energy and less chance of snapping fastener. This allows the fastener to be driven deeper in holes with no dust removal by providing a place for the dust at the bottom of the hole to compact if the hole isn't drilled deep enough to accommodate the dust.

The flutes are oriented equidistantly relative to the circumference of the fastener 1100. In the example shown, the flutes 1110a-1110d have the same radius; however, it is also possible to produce the longitudinal flutes that have different radii. In another embodiment, each flute 1110 may have a width (between for example sides 114 and 1116) which is greater adjacent to end 1118 than at end 1112. In a still further embodiment, the flutes may lie at an angle to the axis CL of the fastener instead of being parallel with the axis CL as shown in the figures.

As noted above, the fluted tip structure of FIGS. 11-13 may be used alone in a fastener or in combination with any one or more of the features described herein.

Figure 14:
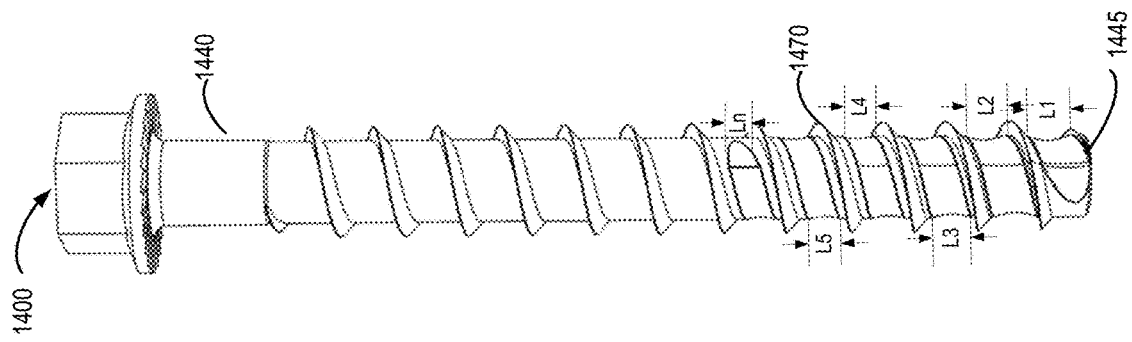
FIG. 14 is a plan view of a fastener showing another feature for use alone or in combination with any one or more of the features for a concrete fastener described herein, feature comprising a variable length detent region between respective terms of a thread in the fastener.
Figure 15:
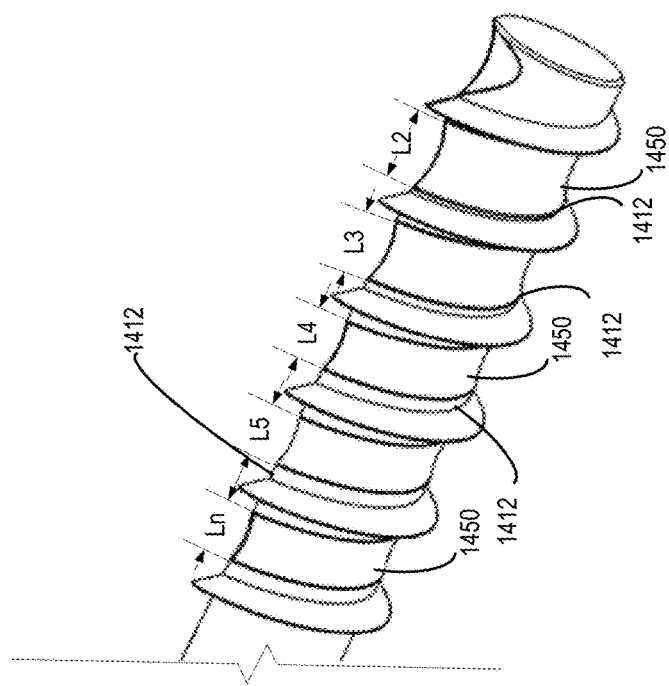
FIG. 15 is a partial perspective view of the fastener FIG. 14.

FIGS. 14 and 15 show another feature of the concrete fastener of the present technology for use alone or in combination with any one or more of the features for a concrete fastener described herein. The feature comprises a variable length detent region between respective terms of a thread in the fastener. FIG. 14 is a plan view of a fastener showing this feature. FIG. 15 is a partial perspective view of the fastener of FIG. 14.

In this embodiment, the fastener 1400 includes a shank 1440 having includes a dust removal detent 1450 formed between turns of the thread 1470. The detent 1450 is a continuous helical structure formed in the shank and interleaved between and matching the turns of the thread 1470, but in this embodiment has a continuously decreasing area (illustrated by decreasing lengths L2-L5) as the detent moves farther away from tip 1445. The detent is formed to have a concave and arcuate shape relative to the shank. Each turn of the detent 1450 a length L2-Ln which may decrease with each turn or decrease incrementally over multiple turns. With each decrease in length L2-Ln, the separation regions 1412 increase in length. In the embodiment described above with respect to FIGS. 3-5, it was noted that the detent has a depth defined by the difference between minor diameter D2 and a lower minor diameter D3, and that in embodiments, the detent depth varies along the length of the fastener between the detent near the tip (having the greatest depth) and gets shallower as the detent moves away from the tip. In an embodiment, described above, where a fastener has a four-inch length between a tip of the fastener and the bottom of washer comprising a portion of a head structure, L1 depth is 0.025, L2 has a depth of 0.020 inch, L3 has a depth of 0.015 inch, and L4, L5 and Ln have a depth of 0.010 inch.

FIGS. 14 and 15 illustrate this further. In one embodiment, as the detent 1450 approaches the tip, both the length (Ln through L2) and the depth increase as it approaches the tip. As most of the cutting happens at the tip, the dust channel is largest in this section. When combined with the flutes feature, or when used alone, this feature makes for a much more efficient dust removal system as the dust is picked up in the channels and as the screw turns, it is funneled to the flutes and pushed down to the bottom of the hole. The detent 1450 also prevents the dust from binding up in the threads by increasing the gap between the screw shank and the wall of the hole.

As noted above, the variable detent structure of FIGS. 14 and 15 may be used alone in a fastener or in combination with any one or more of the features described herein.

FIG. 16 is a partial perspective view of a fastener showing another feature for use alone or in combination with any one or more of the features for a concrete fastener described herein, the feature comprising a triobular thread. FIG. 17 is an end view of the fastener FIG. 16.

Fastener 1600 includes a threaded portion 1610 formed about a cylindrical shank having a center line axis CL. In one configuration, the helix threads are right-hand turned, but in alternative configurations may be left-hand turned. Each turn of the helical thread is formed by an upper surface and a lower surface. As illustrated in FIG. 17, each turn has the same triobular cross section with three arcuate sides 1762, 1764, and 1766 joined at three apexes 1772, 1774, and 1776. The triobular cross section has a characteristic that a cross sectional distance W1 will be the same when measured between any two opposing points on sides 1762, 1764, and 1766 or apexes 1772, 1774, and 1776 which are 180 degrees apart relative to centerline CL of the fastener 1700. Note that the centerline CL is the centerline of the fastener (as illustrated in FIG. 2). The distance from the centerline to each apex is a distance W2, which can be defined as the radius of a circle defined by dashed line 1765 in FIG. 17. In FIG. 17, the triobular thread is defined so that sides 1772, 1774 and 1776 are aligned at any cross-section taken through the fastener. This thread form reduces the installation energy by reducing the contact area of the threads with the concrete. The thread can cut with 3 points and retain its holding strength with those 3 points. It can also have different amount of trilobular shape on different section of the fastener. For example, one may configure an aggressive trilobular shape on the cutting threads, and a mild trilobular shape or even a full round shape on the remaining threads. This gives the benefit of the reduced friction on the cutting threads and the higher capacity on the remaining threads.

As noted above, the triobular thread structure illustrated in FIGS. 16 and 17 may be used alone in a fastener or in combination with any one or more of the features described herein.

Figure 19:
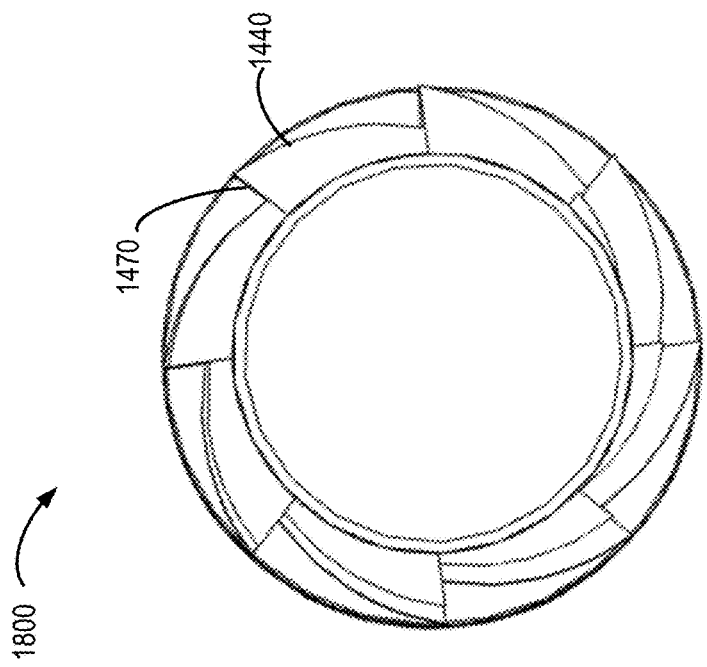
FIG. 19 is an end view of the fastener of FIG. 18.
Figure 18:
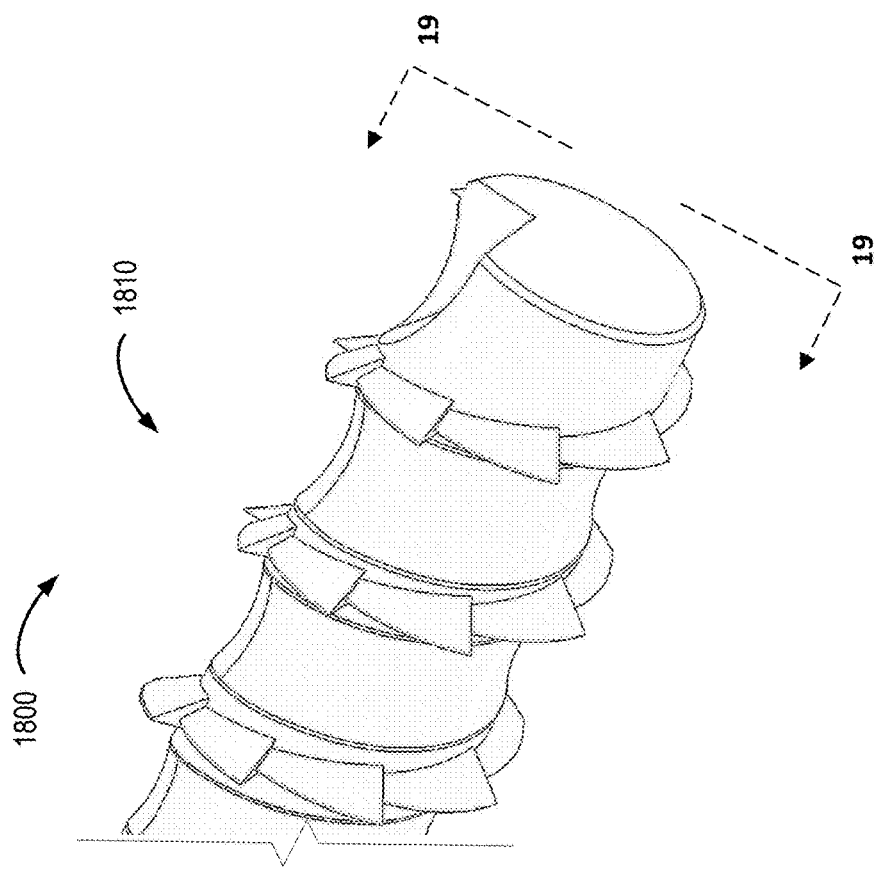
FIG. 18 is a partial perspective view of a fastener showing another feature for use alone or in combination with any one or more of the features for a concrete fastener described herein, the feature comprising a novel sawtooth thread.

FIG. 18 is a partial perspective view of a fastener showing another feature for use alone or in combination with any one or more of the features for a concrete fastener described herein, the feature comprising a novel sawtooth thread. FIG. 19 is an end view of the fastener of FIG. 18.

FIGS. 18 and 19 illustrate a novel sawtooth tip feature which may be used with any of the foregoing features in a fastener in accordance with the present technology. The sawtooth portion 1810 of fastener 1800 includes a plurality of teeth 1730 each having a triangular leading edge 1770 followed by a shell-shaped trailing edge 1740. The trailing edge of each tooth intersects a face of the leading edge 1770. In one embodiment, the leading edge/face forms an angle normal to the shank. In other embodiments, the leading edge may be angled forward relative to the turn of the thread. This thread form on the tip significantly reduces the installation energy by chipping out the concrete using the sharp full profile at the leading edge of each segment while reducing the friction on the cutting threads by tapering the profile on the remainder of the segment.

As noted above, the sawtooth thread structure illustrated in FIGS. 18 and 19 may be used alone in a fastener or in combination with any one or more of the features described herein.

Figure 20:
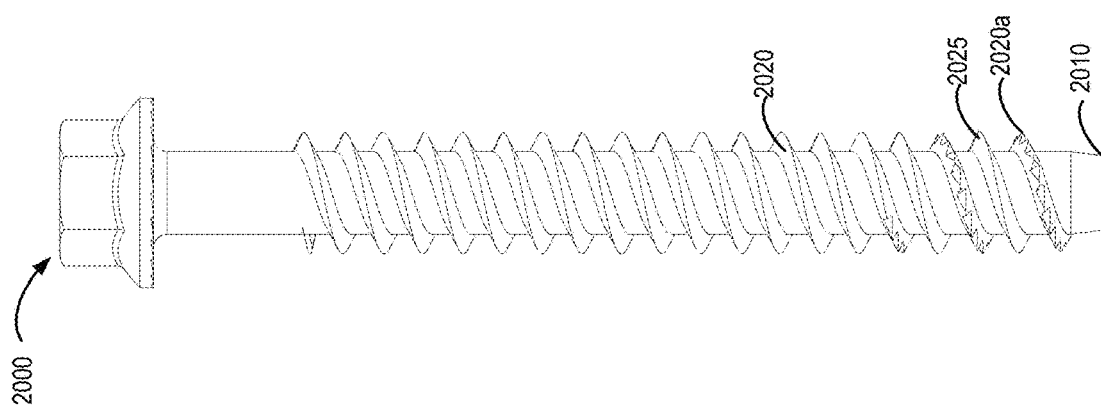
FIG. 20 is a plan view of a faster illustrating another feature for use alone or in combination with any one or more of the features described for a concrete fastener described herein, the feature comprising a dual lead thread.

FIG. 20 is a plan view of a faster illustrating another feature for use alone or in combination with any one or more of the features described for a concrete fastener described herein, the feature comprising a dual lead thread.

Fastener 2000 utilizes dual lead threads, each starting 180 degrees apart at tip 2010 of fastener 2000. Lead 2020a of thread 2020 may optionally include a serrated edge similar to that of FIG. 1 or of FIGS. 18 and 19. A second lead 2025 may optionally include a serrated edge but in the embodiment of FIG. 20 does not include such serrations. Using two thread leads instead of one allows the fastener to install twice as deep for each turn of the fastener. This provides a faster installation and keeps the same distance between the threads and allows the fastener to install deeper into hard concrete.

As noted above, the dual lead thread structure illustrated in FIG. 20 may be used alone in a fastener or in combination with any one or more of the features described herein.

Figure 21:
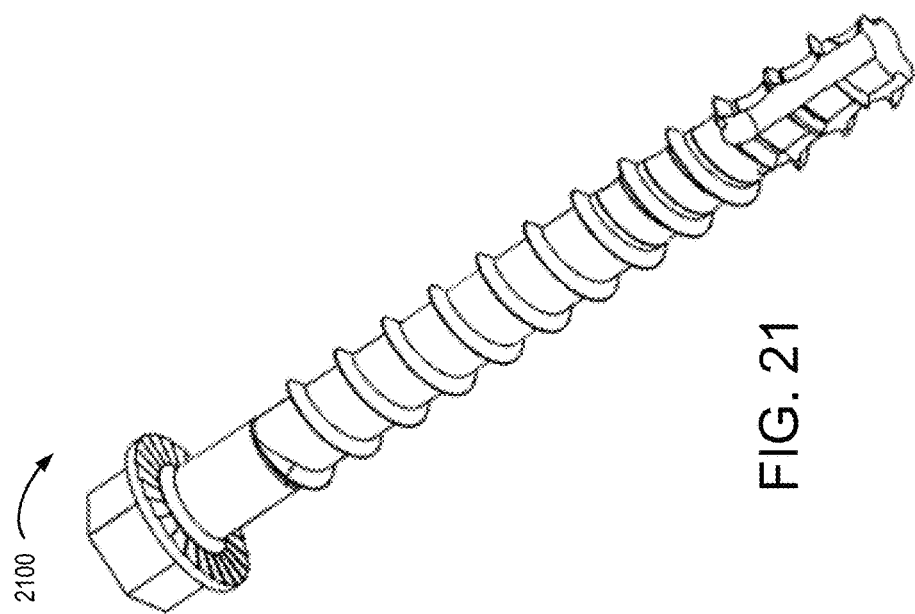
FIG. 21 is a perspective view of an embodiment of the present technology showing a fastener combining detent region and flute features.
Figure 22:
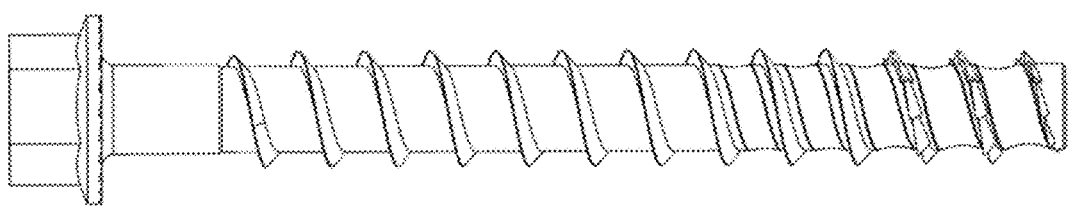
FIG. 22 is a plan view of an embodiment of the present technology illustrating a fastener combining a detent region and saw-tooth features.

As noted herein, any of the foregoing features may be combined with others of such features. Illustrated in FIGS. 21 and 22 are representations of such combinations. FIG. 21 is a perspective view of an embodiment of the present technology showing a fastener combining detent region and flute features, both of which are described above. FIG. 22 is a plan view of an embodiment of the present technology illustrating a fastener combining a detent region and sawtooth features, both of which are described above. Although numerous combinations are described herein, it will be recognized that any such features may include any of the features described herein in combination.

Embodiments of the fastener are suitable for insertion into a concrete material having a pre-formed bore of sufficient diameter to accommodate a diameter of the shank and for forming a self-threaded grooves in the bore in the concreate material.

Embodiments of the fastener described herein may include: a fastener having a flat-topped thread; and/or a shank detent region; and/or a variable length shank detent region; and/or a fastener having a variable depth shank detent region; and/or a thread with a first thread angle in a region adjacent to the tip or leading end of the fastener and a second, smaller thread angle in a region between the first thread angle and the second end of the fastener and/or one or more flutes at the tip of the fastener; and/or a tri-obular thread; and/or a portion of the thread novel saw-tooth thread having a triangular leading edge followed by a shell-shaped trailing edge; and/or a dual lead thread at the tip of the fastener.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fastener, comprising:
 a shank having a first end and a second end defining a length; and
 a thread provided on the shank, the thread including a first region adjacent to the first end and a second region between the first region and a head at the second end, the thread includes a leading edge and a trailing edge, each edge forming an angle with a surface of the shank, the leading edge forming a non-normal angle with the surface of the shank and the trailing edge forming an angle within five degrees of normal to a portion of the surface of the shank;

the fastener further including an arcuate detent region in the shank between respective turns of the thread, the detent region having a length, the length decreasing from the first end toward the second end between the respective turns.

2. The fastener of claim 1 wherein the detent is separated from the respective turns on a first side of the detent and a second side of the detent by flat separation.

3. The fastener of claim 1 wherein the thread extends from the first end adjacent to a tip of the shank, and a plurality of flutes are positioned along a length of the shank.

4. The fastener of claim 1 wherein the detent region has a depth, and the depth of the detent region decreases between the tip and the head.

5. The fastener of claim 1 wherein the thread has a trilobular cross-section.

6. The fastener of claim 1 wherein a portion of the thread includes a sawtooth structure comprising a plurality of shell-shaped teeth.

7. The fastener of claim 1 wherein the thread comprises a first lead thread and further includes a second lead thread interposed between turns of the first lead thread.

8. A fastener, comprising:
a shank having a first end and a second end defining a length; and
a thread provided on the shank, the thread including a first region adjacent to the first end and a second region between the first region and a head at the second end, the thread includes a leading edge and a trailing edge in a first portion of the thread and a second portion of the thread, the first portion of the thread adjacent to the first end and having a first thread angle, the second portion of the thread between the first end and the second portion having a second, smaller angle;
the fastener further including an arcuate detent region in the shank between respective turns of the thread, the detent region having a length, the length decreasing from the first end toward the second end between the respective turns;
wherein the detent is separated from the respective turns by the circular cross-section on a first side of the detent and a second side of the detent by flat separation.

9. The fastener of claim 8 wherein the thread extends from the first end adjacent to a tip of the shank, and a plurality of flutes are positioned along a length of the shank.

10. The fastener of claim 8 wherein the detent region has a depth, and the depth of the detent region decreases between the tip and the head.

11. The fastener of claim 8 wherein a portion of the thread includes a sawtooth structure comprising a plurality of shell-shaped teeth.

* * * * *